United States Patent
Strobel

(10) Patent No.: US 7,443,580 B2
(45) Date of Patent: Oct. 28, 2008

(54) APPARATUS FOR PUPIL DISTANCE ADJUSTMENT FOR EYEPIECES

(75) Inventor: Peter Strobel, Grub AR (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 309 days.

(21) Appl. No.: 11/385,631

(22) Filed: Mar. 21, 2006

(65) Prior Publication Data

US 2006/0215259 A1 Sep. 28, 2006

(30) Foreign Application Priority Data

Mar. 22, 2005 (DE) ............ 10 2005 013 295
Sep. 13, 2005 (DE) ............ 10 2005 043 646

(51) Int. Cl.
*G02B 23/00* (2006.01)
*G02B 21/20* (2006.01)

(52) U.S. Cl. .................... 359/413; 359/375
(58) Field of Classification Search ........... 359/375, 359/376, 411, 412, 413, 480
See application file for complete search history.

(56) References Cited

U.S. PATENT DOCUMENTS

| 2,393,339 | A | * | 1/1946 | Russell .................. 359/413 |
| 3,434,772 | A | | 3/1969 | Fogle |
| 3,914,012 | A | | 10/1975 | Boughton |
| 4,175,826 | A | | 11/1979 | Blaha et al. |
| 4,611,493 | A | | 9/1986 | Muth |
| 5,734,499 | A | * | 3/1998 | Matsumoto et al. ......... 359/417 |

FOREIGN PATENT DOCUMENTS

| DE | 891762 | 10/1953 |
| DE | 2502209 A1 | 1/1975 |

* cited by examiner

*Primary Examiner*—Alessandro Amari
(74) *Attorney, Agent, or Firm*—Hodgson Russ LLP

(57) ABSTRACT

An apparatus for pupil distance adjustment for a binocular tube (22) has two eyepiece carriers (1, 2), at least one of which is mounted rotatably about a rotation axis (3, 4), a threaded spindle (7) being provided which is actuatable for pupil distance adjustment and by way of whose threads (12) the spacing of the two eyepiece carriers (1, 2) is adjustable. The apparatus can be implemented in mechanically simple and compact fashion, and permits accurate adjustment of the pupil distance.

6 Claims, 5 Drawing Sheets

APPARATUS FOR PUPIL DISTANCE ADJUSTMENT FOR EYEPIECES

CROSS REFERENCE TO RELATED APPLICATIONS

This application claims priority of the German patent application nos. 10 2005 013 295.2 filed Mar. 22, 2005 and 10 2005 043 646.3 filed Sep. 13, 2005, both of which are incorporated by reference herein.

FIELD OF THE INVENTION

The present invention relates to an apparatus for pupil distance adjustment for a binocular tube having two eyepiece carriers. A binocular tube of this kind is used, for example, for stereomicroscopes, in which it is possible to view the microscope image in three-dimensional fashion. The two viewing beams are directed; in two eyepiece carriers, to a respective eyepiece for the left and the right eye. Typical pupil distances are between approximately 52 and 76 mm. It is desirable for the user to be able to adapt the pupil distance to personal requirements by way of an adjustment device.

BACKGROUND OF THE INVENTION

Binocular tubes of the Applicant are known in which the pupil distance adjustment is accomplished via two spindle drives, one of which is provided for each eyepiece carrier. This spindle drive can be added on at a later time and, for that reason among others, exhibits play. A hysteresis consequently occurs, so that upon adjustment of the pupil distance there is at first no reaction on the part of the adjustment device (correlation is not linear).

A further disadvantage with known pupil distance adjustment devices is the complexity of installation at a later time, larger physical volume, and high parts cost. Readoff accuracy is decreased because of the play and other factors (such as conversion ratio) in the spindle drive.

It is therefore desirable to describe an apparatus for pupil distance adjustment that is technically and mechanically simple and of compact configuration, and ensures user-friendly operation with a readoff accuracy unaffected by play.

SUMMARY OF THE INVENTION

What is proposed according to the present invention is an apparatus for pupil distance adjustment for a binocular tube having two eyepiece carriers, at least one of which is mounted rotatably about a rotation axis, a threaded spindle being provided which is actuatable for pupil distance adjustment and by way of whose threads the spacing of the two eyepiece carriers is adjustable.

According to the present invention only one threaded spindle is provided, which can be integrated in mechanically simple fashion, and with a very compact cross section, into the binocular tube having the two eyepiece carriers. Actuation of this threaded spindle causes one eyepiece carrier to be rotated on its mount about its rotation axis. The other eyepiece carrier either can be stationary or can likewise be mounted rotatably on a rotation axis; in the latter case, both eyepiece carriers are usefully connected to one another via a positive entrainment device in order to ensure symmetrical adjustment.

Actuation of the threaded spindle is advantageously accomplished via one or two rotary knobs that are mechanically connected to the threaded spindle. Provision can of course also be made for automatic, for example computer-controlled, adjustment.

In order to minimize play, the threaded spindle is mounted in an axial bearing, the threaded spindle being at least partly surrounded on one side by a segment that is pressable by means of a nut against the axial bearing. In this particularly advantageous embodiment, the threaded spindle is held axially in the axial bearing by means of the segment, the segment being in turn pressed by means of the nut against the axial bearing. The segment thus has zero play. It is useful if the threaded spindle has an undercut or a groove that extends along the periphery of the spindle and into which the (for example, semiannular) segment engages.

In the context of the embodiment already mentioned in which the two eyepiece carriers are connected to one another via a positive entrainment device, it is advantageous if this positive entrainment device encompasses an entrainment stud and a fork. The entrainment stud engages into the fork, with the result that both eyepiece carriers are positively guided and each rotate through the same angle (1:1 conversion ratio).

A further possibility for a positive entrainment device is represented by a gear adjustment system having two contra-rotating gears that engage into one another and are each associated with one eyepiece carrier.

A suitable pupil distance indicator can be implemented by the fact that one eyepiece carrier comprises a pointer and the other a scale for indicating the pupil distance by means of the pointer. The indicator is without influence in terms of the play of the pupil distance adjustment mechanism.

BRIEF DESCRIPTION OF THE DRAWINGS

An exemplifying embodiment of the invention illustrated in the attached Figures, and its advantages, will be explained in more detail below, wherein.

DETAILED DESCRIPTION OF THE INVENTION

Figure 1:
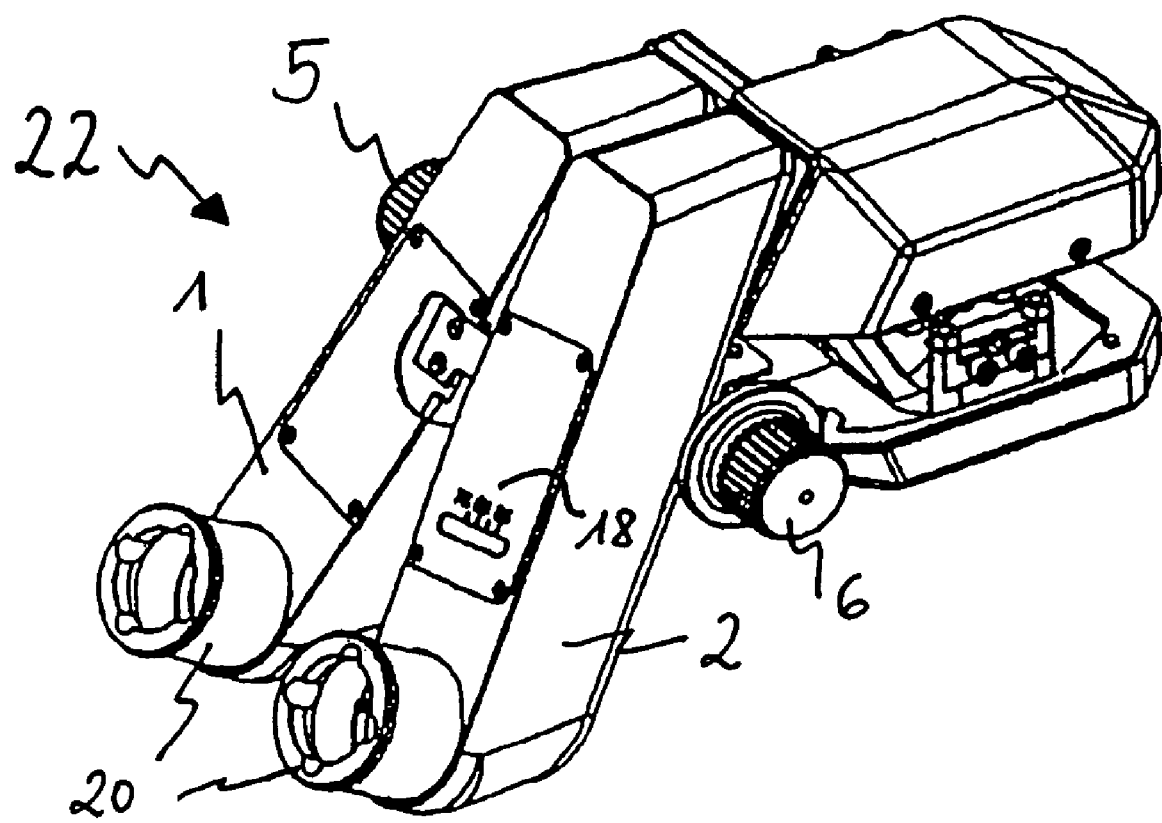
FIG. 1 is a perspective view of a binocular tube having a pupil distance adjustment device according to the present invention.

FIG. 1 is a perspective view showing a binocular tube 22 that is often used for stereomicroscopes, in particular including surgical microscopes. Binocular tube 22 that is depicted comprises a pupil distance adjustment device according to the present invention, which is fixedly installed on the tube 22 below the two eyepiece carriers 1, 2, i.e. below the limbs. This capability for fixed integration of the apparatus for pupil distance adjustment allows a compact design and moreover prevents play and hysteresis. FIG. 1 schematically depicts, in addition to the two eyepiece carriers 1 and 2, the associated eyepieces 20 as well as rotary knobs 5 and 6 for adjusting the pupil distance adjustment device. The pupil distance that is actually set can be ascertained by way of indicator 18. A continuous zero-play adjustment at least in the range from 52 to 76 mm is advantageous.

Figure 2:
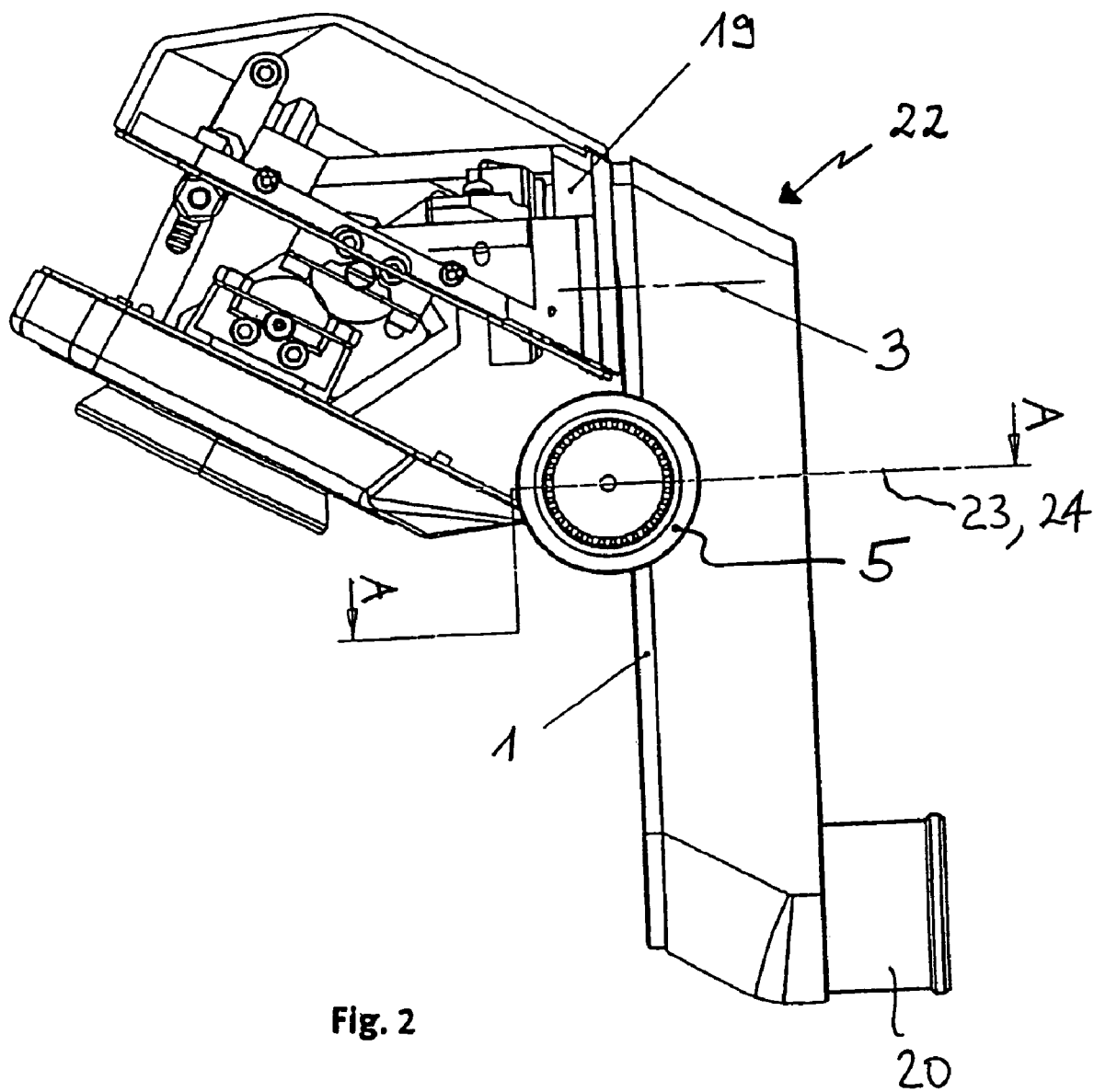
FIG. 2 is a laterally sectioned view of a binocular tube as shown in FIG. 1.

FIG. 2 is a lateral section in the longitudinal direction of an eyepiece carrier, labeled 1, as shown in FIG. 1. The eyepiece is once again labeled 20, and the rotary knob for adjusting pupil distance is labeled 5. Eyepiece carrier 1 is mounted rotatably on rotation axis 3. The two (left and right) eyepiece carriers 1 and 2 are connected to one another on housing part 19 of binocular tube 22 by being mounted on the two rotation axes 3 and 4 (FIG. 3) in such a way that the pupil distance can be set by rotating one of rotary knobs 5 or 6.

Figure 3:
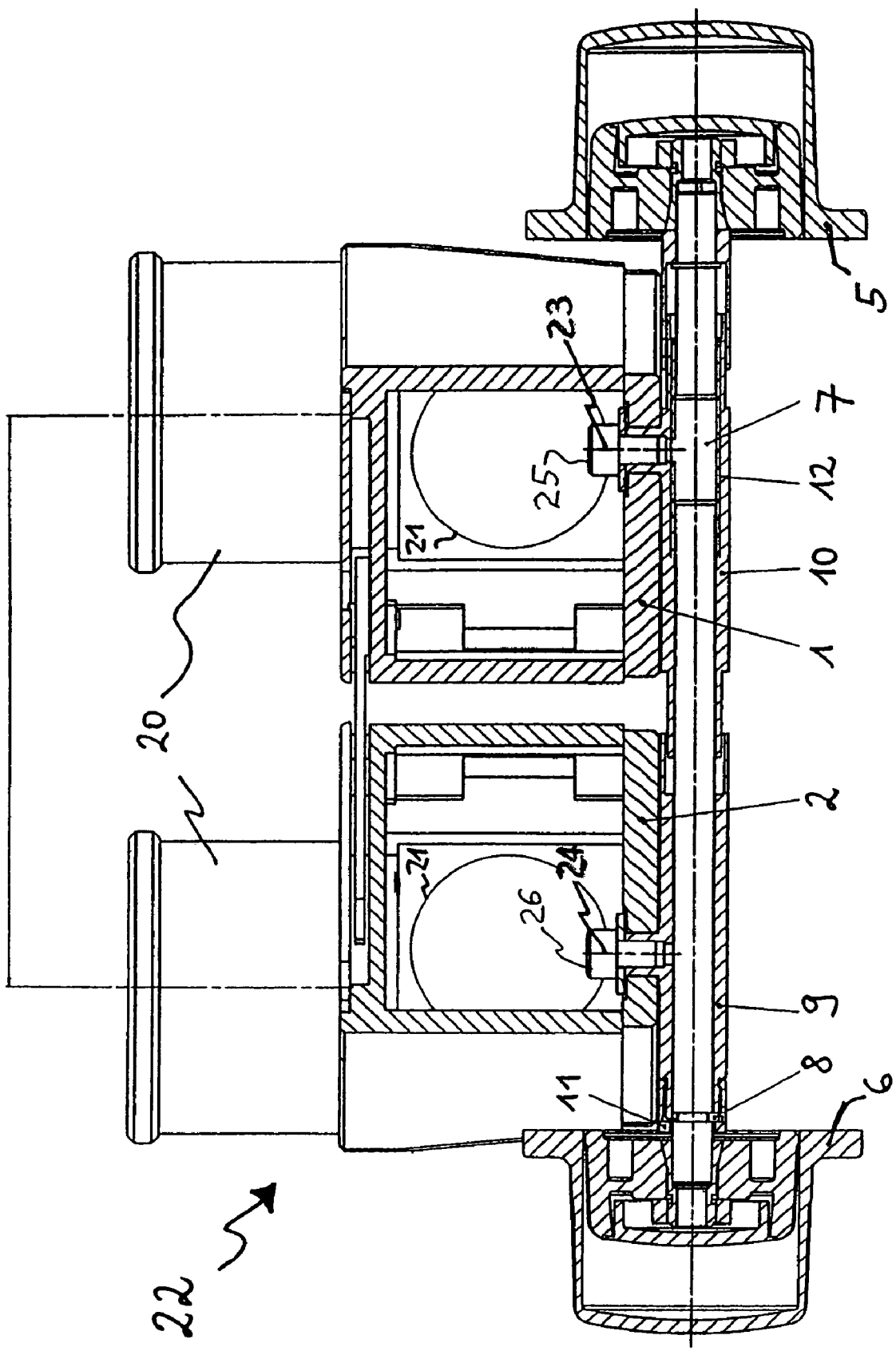
FIG. 3 shows the binocular tube of FIG. 2 along section AA.

FIG. 3 shows a particularly preferred embodiment of the apparatus according to the present invention for pupil distance adjustment. This Figure depicts section AA along the line labeled A-A in FIG. 2, depicting eyepieces 20, the two eyepiece carriers 1 and 2, rotation axis 23 about which spindle bearing 10 rotates relative to eyepiece carrier 1 as defined by a pivot pin 25, rotation axis 24 about which axial bearing 9 rotates relative to eyepiece carrier 2 as defined by a pivot pin 26, and the laterally arranged rotary knobs 5 and 6. Beam cross sections 21 through binocular tube 22 are indicated inside eyepiece carriers 1 and 2.

Rotary knobs 5 and 6 are mechanically connected to threaded spindle 7. Threaded spindle 7 is axially mounted in a spindle bearing 10 and axial bearing 9. The threads are labeled 12. By rotation of one of rotary knobs 5 or 6, eyepiece carriers 1 and 2 can be driven, by way of the threaded spindle, to rotate about the respective rotation axes 3 and 4. The rotation occurs as a function of the friction in the mount. The rotation of eyepiece carrier 1 is transferred by way of the positive entrainment device (to be explained later with reference to FIG. 4) directly to eyepiece carrier 2, so that the two eyepiece carriers execute a rotary motion through the same angle in opposite directions about the rotation axes.

Figure 5:
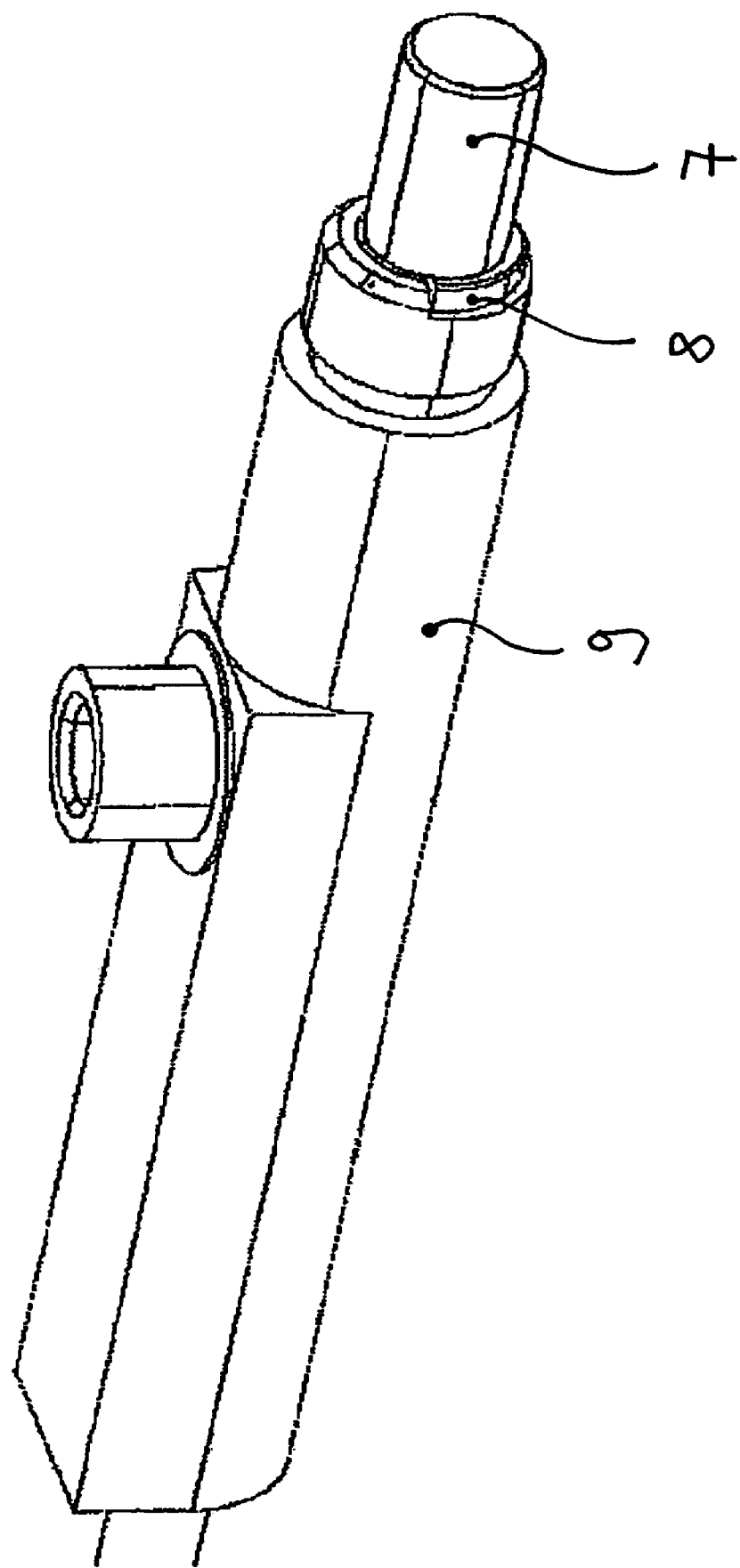
FIG. 5 is a perspective view showing an arrangement of a segment between the threaded spindle and axial bearing for zero-play mounting.

Threaded spindle 7 is held axially in axial bearing 9 by means of a segment 8. Segment 8 is pressed by means of nut 11 against axial bearing 9. Spindle 7 has at one end, for this purpose, an undercut or a groove at which spindle 7 is laid into segment 8. Segment 8 is in contact on one side against the axial bearing. It is advantageous to configure segment 8 in a semiannular or semicircular shape. These relationships are elucidated once again in FIG. 5.

A rotation of threaded spindle 7 changes the position of threads 12 axially with respect to spindle bearing 10, which is mounted rotatably in eyepiece holder 1, with the result that the pupil distance is set to the desired spacing.

Figure 4:
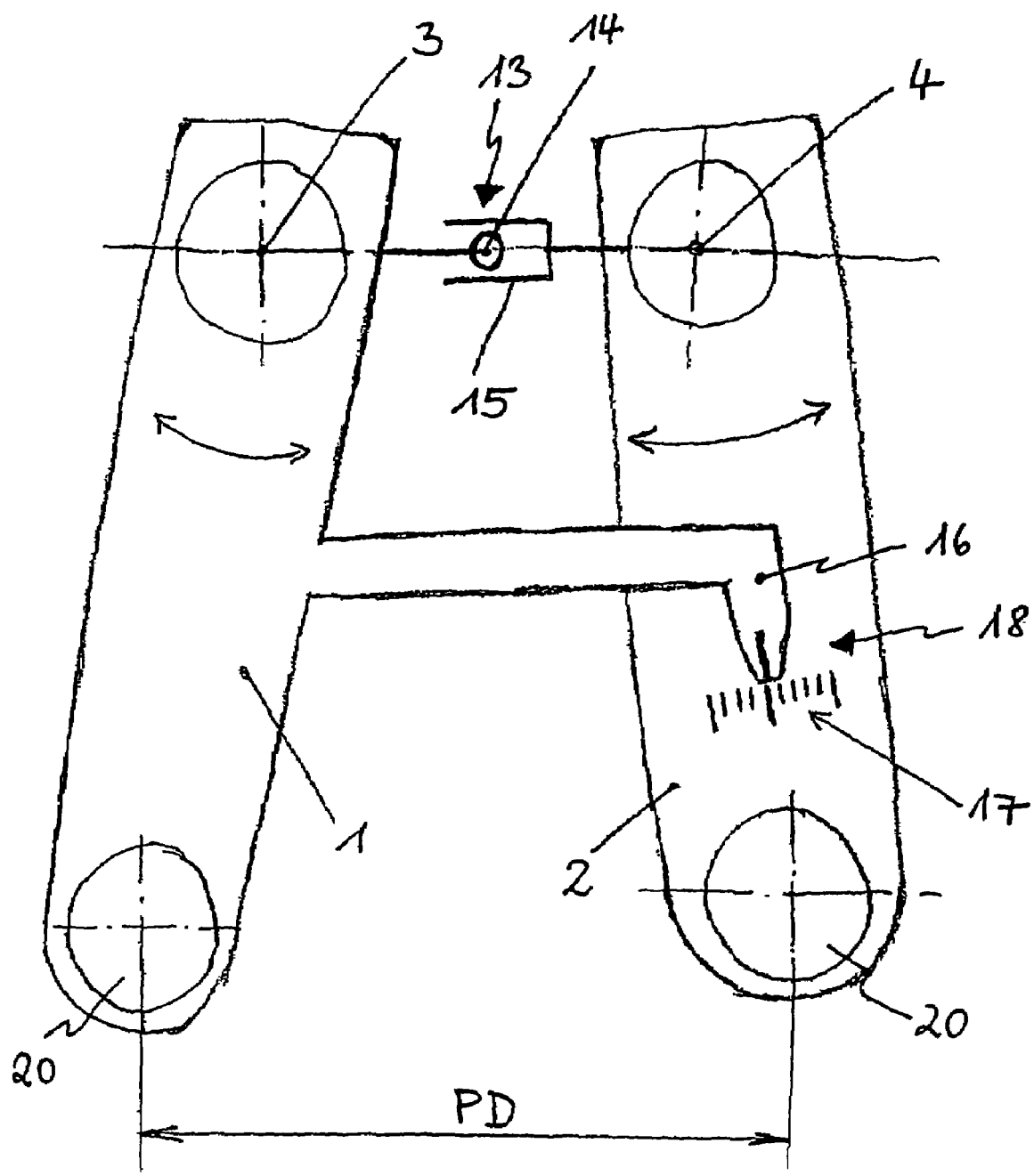
FIG. 4 is a schematic front view of the eyepiece carriers showing the implementation of a positive entrainment device in a pupil distance adjustment device according to the present invention.

FIG. 4 shows an advantageous embodiment of the symmetrical adjustment of the two eyepiece carriers 1 and 2 by way of the pupil distance adjustment device according to the present invention. The plan view of the two eyepiece carriers 1 and 2 very schematically depicts positive entrainment device 13 as well as indicator 18 for the pupil distance (PD).

As explained with reference to FIG. 3, eyepiece carrier 1, which is mounted rotatably about rotation axis 3, has a rotary motion about rotation axis 3 imparted to it via the threaded spindle. Because of positive entrainment device 13, the two eyepiece carriers 1 and 2 move away from or toward one another symmetrically with respect to the tube interface. Eyepiece carrier 1 rotates with entrainment stud 14 about rotation axis 3; and eyepiece 2 rotates with fork 15, which has force applied to it by stud 14, about rotation axis 4.

A simple and appropriate pupil distance indicator 18 can be implemented, for example, by the fact that a pointer 16 is mounted on one eyepiece carrier 1 and points to a scale 17 located on the other eyepiece carrier 2. This scale is calibrated in such a way that it indicates the pupil distance (labeled PD in FIG. 4). The eyepieces are once again labeled 20 in FIG. 4. The advantage of indicator 18 is that pupil distance PD is indicated in absolute fashion, i.e. without any influence in terms of the pupil adjustment mechanism.

Parts List

1 Eyepiece carrier
    2 Eyepiece carrier
    3 Rotation axis of eyepiece carrier 1
    4 Rotation axis of eyepiece carrier 2
    5 Rotary knob
    6 Rotary knob
    7 Threaded spindle
    8 Segment
    9 Axial bearing
    10 Spindle bearing
    11 Nut
    12 Threads
    13 Positive entrainment device
    14 Entrainment stud
    15 Fork
    16 Pointer
    17 Scale
    18 Indicator
    19 Housing part
    20 Eyepieces
    21 Beam cross section
    22 Binocular tube
    23 Rotation axis of spindle bearing 10
    24 Rotation axis of axial bearing 9
    25 Pivot pin
    26 Pivot pin

What is claimed is:

1. An apparatus for pupil distance adjustment for a binocular tube having two eyepiece carriers, at least one of the eyepiece carriers being mounted on the binocular tube for rotation about a rotation axis, the apparatus comprising:

a threaded spindle coupled to the two eyepiece carriers, the threaded spindle having threads for adjusting the pupil distance of the binocular tube; and an axial bearing in which the threaded spindle is mounted, wherein the threaded spindle is rotatable about its axis relative to the axial bearing, and is prevented from moving in an axial direction relative to the axial bearing by a segment held against an end of the axial bearing by a nut, the segment being received in an annular groove in the threaded spindle.

2. The apparatus according to claim 1, wherein the threaded spindle is mechanically connected to at least one rotary knob.

3. The apparatus according to claim 1, wherein the two eyepiece carriers are each rotatably mounted on the binocular tube for rotation about a respective rotation axis, and the apparatus further comprises a positive entrainment device connecting the two eyepiece carriers to one another.

4. The apparatus according to claim 3, wherein the positive entrainment device includes an entrainment stud and a fork receiving the entrainment stud.

5. The apparatus according to claim 1, wherein one of the two eyepiece carriers includes a pointer and the other of the two eyepiece carriers includes a scale, the pointer being arranged to indicate the pupil distance on the scale.

6. A binocular tube comprising:

a housing part;

a pair of eyepiece carriers each mounted on the tube body for rotation about a respective rotation axis;

a threaded spindle having adjustment threads;

an axial bearing receiving the threaded spindle, the threaded spindle being held in an axially fixed position and rotatable about its longitudinal axis relative to the axial bearing, wherein the axial bearing is pivotally coupled to one of the pair of eyepiece carriers at a location spaced from the rotation axis of the one eyepiece carrier; and a spindle bearing mating with the adjustment threads of the threaded spindle, the spindle bearing moving in an axial direction relative to the threads when the spindle is rotated about its longitudinal axis, wherein the spindle bearing is pivotally coupled to another of the pair of eyepiece carriers at a location spaced from the rotation axis of the another eyepiece carrier;

whereby rotation of the threaded spindle causes adjustment of pupil distance associated with the pair of eyepiece carriers.

* * * * *